United States Patent
Shi

(10) Patent No.: US 11,431,457 B2
(45) Date of Patent: Aug. 30, 2022

(54) METHOD FOR ALLOCATING IDENTIFIER (ID) OF DATA BEARER, TERMINAL DEVICE AND NETWORK DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 812 days.

(21) Appl. No.: 16/340,992

(22) PCT Filed: Jan. 5, 2018

(86) PCT No.: PCT/CN2018/071526
§ 371 (c)(1),
(2) Date: Apr. 10, 2019

(87) PCT Pub. No.: WO2019/134114
PCT Pub. Date: Jul. 11, 2019

(65) Prior Publication Data
US 2021/0367733 A1 Nov. 25, 2021

(51) Int. Cl.
*H04W 72/04* (2009.01)
*H04L 5/00* (2006.01)
(Continued)

(52) U.S. Cl.
CPC .......... *H04L 5/0053* (2013.01); *H04L 5/0094* (2013.01); *H04W 72/042* (2013.01); *H04W 76/15* (2018.02); *H04W 76/25* (2018.02)

(58) Field of Classification Search
CPC ... H04W 76/25; H04W 76/15; H04W 72/042; H04W 24/10; H04W 48/08; H04W 12/10; H04W 80/02; H04W 28/04
See application file for complete search history.

(56) References Cited

U.S. PATENT DOCUMENTS

2014/0335869 A1 11/2014 Choi et al.
2016/0081081 A1 3/2016 Xu et al.
(Continued)

FOREIGN PATENT DOCUMENTS

CN 103517351 A 1/2014
CN 104244426 A 12/2014
(Continued)

OTHER PUBLICATIONS

Extended European Search Report in European Patent Application No. 18852760.0, dated Oct. 4, 2019.
(Continued)

*Primary Examiner* — Chi Ho A Lee
(74) *Attorney, Agent, or Firm* — Ladas & Parry LLP

(57) ABSTRACT

Provided are a method for allocating an Identifier (ID) of a data bearer, a terminal device, a network device and a computer storage medium. The method includes: when receiving Data Radio Bearer (DRB) configuration information sent by a network side, allocating or reconfiguring, by the terminal device, a DRB ID; and sending, by the terminal device, a DRB configuration confirmation instruction to the network side, wherein the allocated DRB ID or the reconfigured DRB ID is used as or is contained in the DRB configuration confirmation instruction.

15 Claims, 3 Drawing Sheets

---

101 — When receiving DRB configuration information sent by a network side, allocate or reconfigure a DRB ID by a terminal device 102 — Send, by the terminal device, a DRB configuration confirmation instruction to the network side, wherein the allocated DRB ID or the reconfigured DRB ID is used as or is contained in the DRB configuration confirmation instruction

(51) Int. Cl.
*H04W 76/25* (2018.01)
*H04W 76/15* (2018.01)

(56) References Cited

U.S. PATENT DOCUMENTS

| | | | |
|---|---|---|---|
| 2016/0234726 A1* | 8/2016 | Nuggehalli | H04W 48/08 |
| 2016/0242080 A1 | 8/2016 | Vikberg et al. | |
| 2017/0367015 A1 | 12/2017 | Zhang et al. | |
| 2018/0160467 A1* | 6/2018 | Quan | H04W 76/19 |
| 2018/0192426 A1* | 7/2018 | Ryoo | H04W 24/10 |
| 2018/0352462 A1* | 12/2018 | Wu | H04W 76/15 |
| 2020/0059817 A1* | 2/2020 | Baek | H04W 28/04 |
| 2020/0100136 A1* | 3/2020 | Chang | H04W 28/0268 |
| 2020/0120535 A1* | 4/2020 | Dai | H04W 76/00 |
| 2020/0205003 A1* | 6/2020 | Ingale | H04W 12/10 |
| 2020/0245401 A1* | 7/2020 | Ingale | H04W 80/02 |
| 2020/0367108 A1* | 11/2020 | Hori | H04W 76/30 |
| 2021/0153021 A1* | 5/2021 | Kimba Dit Adamou | H04L 41/0803 |
| 2021/0168882 A1* | 6/2021 | Chang | H04W 76/27 |

FOREIGN PATENT DOCUMENTS

| | | |
|---|---|---|
| CN | 104754750 A | 7/2015 |
| CN | 104797000 A | 7/2015 |
| CN | 107018542 A | 8/2017 |
| CN | 107343324 A | 11/2017 |
| CN | 107404750 A | 11/2017 |
| EP | 3171625 | 5/2017 |
| WO | 2014019131 A1 | 2/2014 |
| WO | 2014198133 A1 | 12/2014 |
| WO | 2016000322 A1 | 1/2016 |
| WO | 2016184343 A1 | 11/2016 |

OTHER PUBLICATIONS

International Search Report (ISR) and Written Opinion (WO) dated Sep. 27, 2018 for Application No. PCT/CN2018/071526.
Communication pursuant to Article 94(3) EPC in corresponding EP patent application No. 18852760.0, dated Apr. 14, 2020.
First office action in corresponding Chinese patent application No. 201880003417.X, dated Mar. 2, 2020.

* cited by examiner

METHOD FOR ALLOCATING IDENTIFIER (ID) OF DATA BEARER, TERMINAL DEVICE AND NETWORK DEVICE

RELATED APPLICATION

This application is an application under 35 U.S.C. 371 of International Application No. PCT/CN2018/071526 filed on Jan. 5, 2018, the entire contents of which are incorporated herein by reference.

TECHNICAL FIELD

The disclosure relates to the technical field of information processing, and in particular to a method for allocating an Identifier (ID) of a data bearer, a terminal device, a network device and a computer storage medium.

BACKGROUND

In Long Term Evolution (LTE) duel connection, an identifier used by each bearer is referred to as a Data Radio Bearer Identifier (DRB ID). The bearer, no matter for a Master Cell Group (MCG) or for a Secondary Cell Group (SCG), is allocated and configured by a base station (such as a Master Node (MN) or a Secondary Node (SN)) to a terminal device. In an NR, both the MN and the SN may perform management on DRBs. If an SN wants to increase one DRB, the SN needs to send a corresponding configuration command on a Signaling Radio Bearer (SRB) 3.

However, in the process of increasing the DRB, the SN is not always able to know which DRB ID has been used by a terminal device. Therefore, if the SN directly configures a DRB ID, the problems of conflict and confusion of the DRB ID may be caused.

SUMMARY

In order to solve the above-mentioned technical problems, the embodiments of the disclosure provide a method for allocating an ID of a data bearer, a terminal device, a network device and a computer storage medium.

An embodiment of the disclosure provides a method for allocating an ID of a data bearer, which is applied to a terminal device and may include the following operations.

When receiving DRB configuration information sent by a network side, the terminal device allocates or reconfigures a DRB ID.

The terminal device sends a DRB configuration confirmation instruction to the network side, wherein the allocated DRB ID or the reconfigured DRB ID is used as or is contained in the DRB configuration confirmation instruction.

An embodiment of the disclosure provides a method for allocating an ID of a data bearer, which is applied to a network device and may include the following operations.

DRB configuration information is sent to a terminal device.

A DRB configuration confirmation instruction sent from the terminal device is received, wherein the DRB configuration confirmation instruction contains a DRB ID allocated or reconfigured by the terminal device or a DRB ID allocated or reconfigured by the terminal device is used as the DRB configuration confirmation instruction.

An embodiment of the disclosure provides a terminal device, which may include a first processing unit, and a first communication unit.

The first processing unit is configured to allocate or reconfigure, when receiving DRB configuration information sent by a network side, a DRB ID, and use the allocated DRB ID or the reconfigured DRB ID as a DRB configuration confirmation instruction or arrange a DRB configuration confirmation instruction to contain the allocated DRB ID or the reconfigured DRB ID.

The first communication unit is configured to send the DRB configuration confirmation instruction to the network side.

An embodiment of the disclosure provides a network device, which may include a second communication unit.

The second communication unit is configured to send DRB configuration information to a terminal device; and receive a DRB configuration confirmation instruction sent from the terminal device, where the DRB configuration confirmation instruction contains a DRB ID allocated or reconfigured by the terminal device or a DRB ID allocated or reconfigured by the terminal device is used as the DRB configuration confirmation instruction.

An embodiment of the disclosure provides a terminal device, which may include: a processor and a memory configured to store a computer program capable of being executed on the processor.

The processor, when executing the computer program, implements the operations of the above-mentioned method.

An embodiment of the disclosure provides a network device, which may include: a processor and a memory configured to store a computer program capable of being executed on the processor.

The processor, when executing the computer program, implements the operations of the above-mentioned method.

An embodiment of the disclosure provides a computer storage medium; the computer storage medium stores a computer executable instruction; and the computer storage medium, when being executed, implements the operations of the above-mentioned method.

According to the technical solutions in the embodiments of the disclosure, the terminal device can allocate or reconfigure the DRB ID, so that the problem of a potential conflict of the DRB ID when the MN and the SN respectively and independently configure a DRB can be solved.

DETAILED DESCRIPTION OF THE EMBODIMENTS

In order to know the characteristics and technical contents of the embodiments of the disclosure thoroughly in more detail, the implementation of the embodiments of the disclosure will be described below in detail in combination with accompanying drawings. The appended accompanying drawings are merely for reference, and are not intended to limit the embodiments of the disclosure.

Embodiment 1

Figure 1:
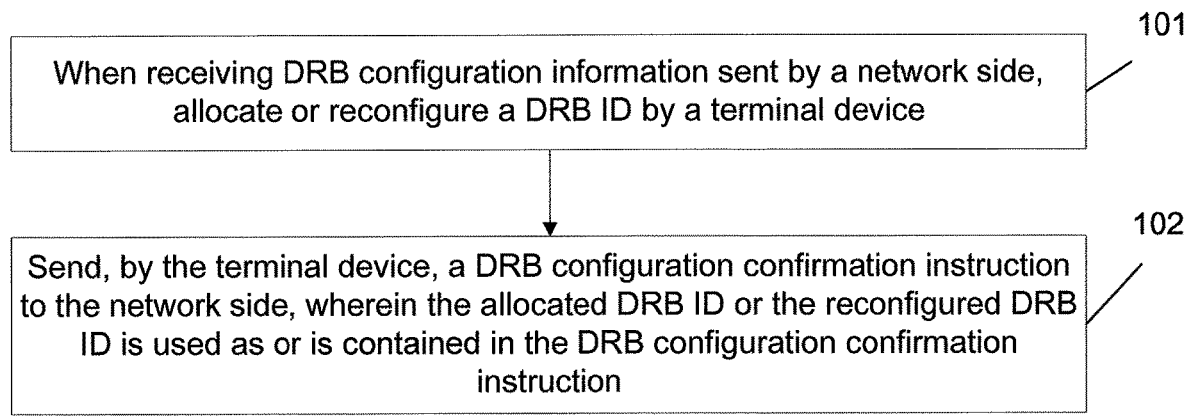
FIG. 1 shows a first schematic diagram illustrating the flow of a method for allocating an ID of a data bearer provided by an embodiment of the disclosure.

An embodiment of the disclosure provides a method for allocating an ID of a data bearer, which is applied to a terminal device and may include the following operations shown in blocks 101 and 102 of FIG. 1.

In block 101, when receiving DRB configuration information sent by a network side, the terminal device allocates or reconfigures a DRB ID.

In block 102, the terminal device sends a DRB configuration confirmation instruction to the network side, wherein the allocated DRB ID or the reconfigured DRB ID is used as or is contained in the DRB configuration confirmation instruction.

The network side in this embodiment may be a network device at the network side, and for example, may be an SN or an MN.

The solutions provided by this embodiment will be described below with reference to several scenarios.

Scenario 1

The operation that when receiving DRB configuration information sent by the network side, the terminal device allocates or reconfigures the DRB ID may be implemented as follows.

When the DRB configuration information does not contain the DRB ID allocated by the network side, one DRB ID is selected from at least one available DRB ID as the allocated DRB ID.

In NR DC, an MN knows which DRB IDs have been used by a terminal device, including those of a MCG bearer and a split bearer. DRB IDs corresponding to the split bearer on the MN and the SN are the same. The SN can know DRB IDs of the split bearer and the SCG bearer. The terminal device knows DRB IDs corresponding to the MCG bearer, the split bearer and the SCG bearer. Hence, when the MN (or the SN) configures to increase a DRB without providing any configuration for DRB ID, a terminal device may allocate the DRB ID from at least one available DRB ID, and provide the DRB ID to a base station via an uplink Radio Resource Control (RRC) message.

Figure 2:
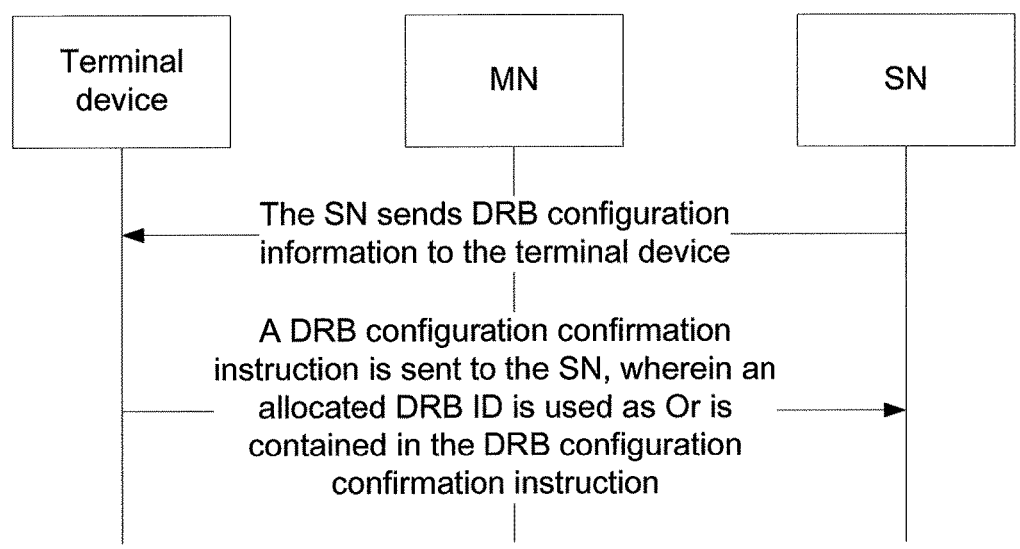
FIG. 2 shows a second schematic diagram illustrating the flow of a method for allocating an ID of a data bearer provided by an embodiment of the disclosure.

For example, referring to FIG. 2, the processing scenario is described from a perspective of information interaction between the SN and the terminal device. The SN sends the DRB configuration information to the terminal device, where a DRB ID is not contained in the DRB configuration information.

The terminal device selects one DRB ID from at least one available DRB ID as the allocated DRB ID, uses the allocated DRB ID as a DRB configuration confirmation instruction or arranges a DRB configuration confirmation instruction to contain the allocated DRB ID, and sends the DRB configuration confirmation instruction to the SN.

Scenario 2

When the DRB configuration information contains a temporary DRB ID allocated by the network side, a terminal device reselects a DRB ID, and replaces the temporary DRB ID with the reselected DRB ID.

Herein, the operation that the terminal device reselects the DRB ID may be implemented as follows.

One DRB ID is selected from at least one available DRB ID.

In NR DC, an MN knows which DRB IDs have been used by a terminal device, including those of a MCG bearer and a split bearer. DRB IDs corresponding to the split bearer on the MN and the SN are the same. The SN can know DRB IDs of the split bearer and the SCG bearer. The terminal device knows DRB IDs corresponding to the MCG bearer, the split bearer and the SCG bearer. Hence, when an MN configures to increase a DRB without providing any configuration for a DRB ID, a terminal device may allocate the DRB ID from at least one available DRB ID, and provide the DRB ID to a base station via an RRC message. If the MN or the SN provides a temporary DRB ID via configuration information, the terminal device may rewrite, i.e., reconfigure the DRB ID configured by the network side. In the rewriting procedure, the terminal device may select one DRB ID from at least one available DRB ID known to the terminal device as the reconfigured DRB ID.

Figure 3:
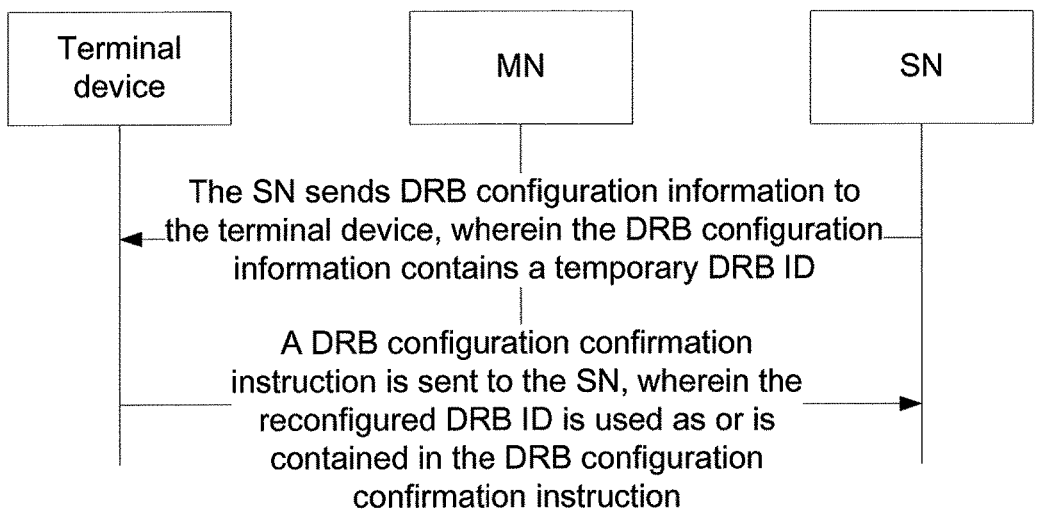
FIG. 3 shows a third schematic diagram illustrating the flow of a method for allocating an ID of a data bearer provided by an embodiment of the disclosure.

Referring to FIG. 3, the interaction between the SN and the terminal device is described and may include the following operations.

The SN sends DRB configuration information to the terminal device, where the DRB configuration information contains a temporary DRB ID allocated by the network side.

The terminal device selects one DRB ID from at least one available DRB ID as a reconfigured DRB ID, uses the reconfigured DRB ID as a DRB configuration confirmation instruction or arranges a DRB configuration confirmation instruction to contain the reconfigured DRB ID, and sends the DRB configuration confirmation instruction to the SN.

As an exemplary implementation, a manner for acquiring DRB configuration information may be as follows: a downlink RRC reconfiguration message sent by the network side is received; and DRB configuration information carried in the downlink RRC reconfiguration message is acquired.

Correspondingly, a manner for sending the DRB configuration confirmation instruction may be as follows: an RRC message carrying the DRB configuration confirmation instruction is sent to the network side.

An embodiment of the disclosure provides a method for configuring a DRB ID, which is different from an existing LTE DC. According to the method, when an SN configures a DRB, an ID of a newly increased DRB is not allocated in a downlink RRC reconfiguration message, or only a temporary ID of the DRB is allocated. When a terminal device receives the configuration signaling, the terminal device allocates a DRB ID, or the terminal device reconfigures the DRB ID temporarily allocated by the SN.

Therefore, by adopting the above solutions, the terminal device can allocate or reconfigure the DRB ID, so that the problem of a potential conflict of the DRB ID when the MN and the SN respectively and independently configure a DRB can be solved.

Embodiment 2

Figure 4:
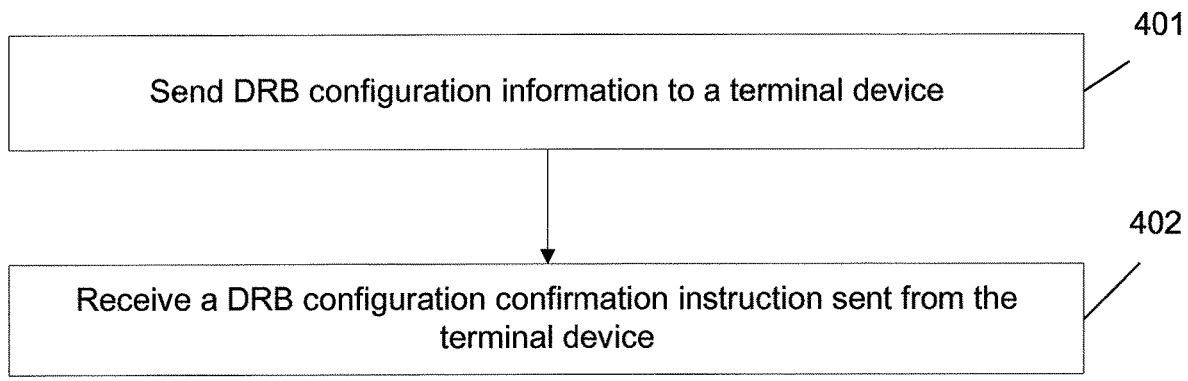
FIG. 4 shows a fourth schematic diagram illustrating the flow of a method for allocating an ID of a data bearer provided by an embodiment of the disclosure.

An embodiment of the disclosure provides a method for allocating an ID of a data bearer, which is applied to a network device and may include the following operations as shown in blocks 401 and 402 of FIG. 4.

In block 401, DRB configuration information is sent to a terminal device.

In block 402, a DRB configuration confirmation instruction sent from the terminal device is received, where the DRB configuration confirmation instruction contains a DRB ID allocated or reconfigured by the terminal device or a DRB ID allocated or reconfigured by the terminal device is used as the DRB configuration confirmation instruction.

The network device in this embodiment may be an SN or an MN.

The solutions provided by this embodiment will be described below with reference to several scenarios.

Scenario 1

The DRB configuration information not containing a DRB ID allocated by a network side is sent to a terminal device.

Under such a scenario, the terminal device selects one DRB ID from at least one available DRB ID as the allocated DRB ID.

In NR DC, an MN knows which DRB IDs have been used by the terminal device, including those of a MCG bearer and a split bearer. DRB IDs corresponding to the split bearer on the MN and the SN are the same. The SN can know DRB IDs of the split bearer and the SCG bearer. The terminal device knows DRB IDs corresponding to the MCG bearer, the split bearer and the SCG bearer. Hence, when the MN (or the SN) configures to increase a DRB without providing any configuration for DRB ID, a terminal device may allocate the DRB ID from at least one available DRB ID, and provide the DRB ID to a base station via an RRC message.

For example, referring to FIG. 2, the processing scenario is described from a perspective of information interaction between the SN and the terminal device. The SN sends the DRB configuration information to the terminal device, where a DRB ID is not contained in the DRB configuration information.

The terminal device selects one DRB ID from at least one available DRB ID as the allocated DRB ID, uses the allocated DRB ID as a DRB configuration confirmation instruction, or arranges a DRB configuration confirmation instruction to contain the allocated DRB ID and sends the DRB configuration confirmation instruction to the SN.

Scenario 2

The DRB configuration information containing a temporary DRB ID is sent to a terminal device.

Correspondingly, the terminal device reselects one DRB ID, and replaces the temporary DRB ID with the reselected DRB ID.

In NR DC, an MN knows which DRB IDs have been used by a terminal device, including those of a MCG bearer and a split bearer. DRB IDs corresponding to the split bearer on the MN and the SN are the same. The SN can know DRB IDs of the split bearer and the SCG bearer. The terminal device knows DRB IDs corresponding to the MCG bearer, the split bearer and the SCG bearer. Hence, when an MN configures to increase a DRB without providing any configuration for a DRB ID, a terminal device may allocate the DRB ID from at least one available DRB ID, and provide the DRB ID to a base station via an RRC message. If the MN or the SN provides a temporary DRB ID via configuration information, the terminal device may rewrite, i.e., reconfigure the DRB ID configured by the network side. In the rewriting procedure, the terminal device may select one DRB ID from at least one available DRB ID known to the terminal device as the reconfigured DRB ID.

Referring to FIG. 3, the interaction between the SN and the terminal device is described and may include the following operations.

The SN sends DRB configuration information to the terminal device, where the DRB configuration information contains a temporary DRB ID allocated by the network side.

The terminal device selects one DRB ID from at least one available DRB ID as a reconfigured DRB ID, uses the reconfigured DRB ID as a DRB configuration confirmation instruction or arranges a DRB configuration confirmation instruction to contain the reconfigured DRB ID, and sends the DRB configuration confirmation instruction to the SN.

As an exemplary implementation, the operation that DRB configuration information is sent to a terminal device may be implemented as follows.

DRB configuration information carried in a downlink RRC reconfiguration message is sent to the terminal device.

Correspondingly, the operation that the DRB configuration confirmation instruction sent from the terminal device is received may be implemented as follows.

The DRB configuration confirmation instruction is acquired from an RRC message sent from the terminal device.

An embodiment of the disclosure provides a method for configuring DRB IDs, which is different from the existing LTE DC. When the SN configures a DRB, an ID of a newly increased DRB is not allocated in a downlink RRC reconfiguration message, or only a temporary ID of the DRB is allocated. When a terminal device receives the configuration signaling, the terminal device allocates a DRB ID, or the terminal device reconfigures the DRB ID temporarily allocated by the SN.

Therefore, by adopting the above solutions, the terminal device can allocate or reconfigure the DRB ID, so that the problem of a potential conflict of the DRB ID when the MN and the SN respectively and independently configure a DRB can be solved.

Embodiment 3

Figure 5:
FIG. 5 shows a schematic diagram of a composition structure of a terminal device provided by an embodiment of the disclosure.

An embodiment of the disclosure provides a terminal device, which may include a first processing unit 51 and a first communication unit 52, as shown in FIG. 5.

The first processing unit 51 is configured to allocate or reconfigure, when receiving DRB configuration information sent by a network side, a DRB ID, and use the allocated DRB ID or the reconfigured DRB ID as a DRB configuration confirmation instruction or arrange a DRB configuration confirmation instruction to contain the allocated DRB ID or the reconfigured DRB ID.

The first communication unit 52 is configured to send the DRB configuration confirmation instruction to the network side.

The network side in this embodiment may be a network device at the network side, and for example, may be an SN or an MN.

The solutions provided by this embodiment will be described below with several scenarios.

Scenario 1

The first processing unit 51 selects, when the DRB configuration information does not contain a DRB ID allocated by the network side, one DRB ID from at least one available DRB ID as the allocated DRB ID.

In NR DC, an MN knows which DRB IDs have been used by the terminal device, including those of a MCG bearer and a split bearer. DRB IDs corresponding to the split bearer on the MN and the SN are the same. The SN can know DRB IDs of the split bearer and the SCG bearer. The terminal device knows DRB IDs corresponding to the MCG bearer, the split bearer and the SCG bearer. Hence, when the MN (or the SN) configures to increase a DRB without providing any configuration for DRB ID, a terminal device may allocate the DRB ID from at least one available DRB ID, and provide the DRB ID to a base station via an RRC message.

For example, referring to FIG. 2, the processing scenario is described from a perspective of information interaction between the SN and the terminal device. The SN sends the DRB configuration information to the terminal device, where a DRB ID is not contained in the DRB configuration information.

The terminal device selects one DRB ID from at least one available DRB ID as the allocated DRB ID, uses the allocated DRB ID as a DRB configuration confirmation instruction or arranges a DRB configuration confirmation instruction to contain the allocated DRB ID, and sends the DRB configuration confirmation instruction to the SN.

Scenario 2

The processing unit 51 is configured to, when the DRB configuration information contains a temporary DRB ID allocated by the network side, reselect a DRB ID, and replace the temporary DRB ID with the reselected DRB ID.

The processing unit 51 selects one DRB ID from at least one available DRB ID.

In NR DC, an MN knows which DRB IDs have been used by a terminal device, including those of a MCG bearer and a split bearer. DRB IDs corresponding to the split bearer on the MN and the SN are the same. The SN can know DRB IDs of the split bearer and the SCG bearer. The terminal device knows DRB IDs corresponding to the MCG bearer, the split bearer and the SCG bearer. Hence, when an MN configures to increase a DRB without providing any configuration for a DRB ID, a terminal device may allocate the DRB ID from at least one available DRB ID, and provide the DRB ID to a base station via an RRC message. If the MN or the SN provides a temporary DRB ID via configuration information, the terminal device may rewrite, i.e., reconfigure the DRB ID configured by the network side. In the rewriting procedure, the terminal device may select one DRB ID from at least one available DRB ID known to the terminal device as the reconfigured DRB ID.

Referring to FIG. 3, the interaction between the SN and the terminal device is described and may include the following operations.

The SN sends DRB configuration information to the terminal device, where the DRB configuration information contains a temporary DRB ID allocated by the network side.

The terminal device selects one DRB ID from at least one available DRB ID as a reconfigured DRB ID, uses the reconfigured DRB ID as a DRB configuration confirmation instruction or arranges a DRB configuration confirmation instruction to contain the reconfigured DRB ID, and sends the DRB configuration confirmation instruction to the SN.

As an exemplary implementation, a manner for acquiring the DRB configuration information may be as follows. The first communication unit 52 is configured to receive a downlink RRC reconfiguration message sent by the network side.

The first processing unit 51 is configured to acquire DRB configuration information carried in the downlink RRC reconfiguration message.

Correspondingly, a manner for sending the DRB configuration confirmation instruction may be as follows. The first communication unit 52 is configured to send an RRC message carrying the DRB configuration confirmation instruction to the network side.

Therefore, by adopting the above solutions, the terminal device can allocate or reconfigure the DRB ID, so that the problem of a potential conflict of the DRB ID when the MN and the SN respectively and independently configure a DRB can be solved.

Embodiment 4

Figure 6:
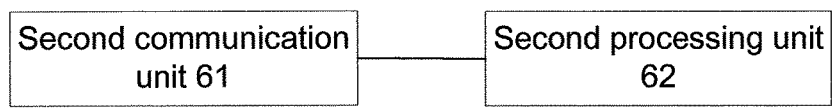
FIG. 6 shows a schematic diagram of a composition structure of a network device provided by an embodiment of the disclosure.

An embodiment of the disclosure provides a network device, which may include a second communication unit 61 as shown in FIG. 6.

The second communication unit 61 is configured to send DRB configuration confirmation to a terminal device; and receive a DRB configuration confirmation instruction sent from the terminal device, where the DRB configuration confirmation instruction contains a DRB ID allocated or reconfigured by the terminal device or a DRB ID allocated or reconfigured by the terminal device is used as the DRB configuration confirmation instruction.

The network device in this embodiment may be an SN or an MN.

The solutions provided by this embodiment will be described below with several scenarios.

Scenario 1

The network device may further include a second processing unit 62.

The second processing unit 62 is configured to provide no DRB ID in the DRB configuration information.

Correspondingly, the second communication unit 61 is configured to send the DRB configuration information not containing a DRB ID allocated by the network side to a terminal device.

Under such a scenario, the terminal device selects one DRB ID from at least one available DRB ID as the allocated DRB ID.

In NR DC, an MN knows which DRB IDs have been used by the terminal device, including those of a MCG bearer and a split bearer. DRB IDs corresponding to the split bearer on the MN and the SN are the same. The SN can know DRB IDs of the split bearer and the SCG bearer. The terminal device knows DRB IDs corresponding to the MCG bearer, the split bearer and the SCG bearer. Hence, when the MN (or the SN) configures to increase a DRB without providing any configuration for DRB ID, a terminal device may allocate the DRB ID from at least one available DRB ID, and provide the DRB ID to a base station via an RRC message.

Scenario 2

The second processing unit 62 is configured to provide a temporary DRB ID in the DRB configuration information.

Correspondingly, the second communication unit 61 is configured to send the DRB configuration information containing the temporary DRB ID to a terminal device.

Correspondingly, the terminal device reselects one DRB ID, and replaces the temporary DRB ID with the reselected DRB ID.

In NR DC, an MN knows which DRB IDs have been used by a terminal device, including those of a MCG bearer and a split bearer. DRB IDs corresponding to the split bearer on the MN and the SN are the same. The SN can know DRB IDs of the split bearer and the SCG bearer. The terminal device knows DRB IDs corresponding to the MCG bearer, the split bearer and the SCG bearer. Hence, when an MN configures to increase a DRB without providing any configuration for a DRB ID, a terminal device may allocate the DRB ID from at least one available DRB ID, and provide the DRB ID to a base station via an RRC message. If the MN or the SN provides a temporary DRB ID via configuration information, the terminal device may rewrite, i.e., reconfigure the DRB ID configured by the network side. In the rewriting procedure, the terminal device may select one DRB ID from at least one available DRB ID known to the terminal device as the reconfigured DRB ID.

As an exemplary implementation, the second communication unit 61 is configured to send DRB configuration information carried in a downlink RRC reconfiguration message to the terminal device.

The second communication unit 61 is configured to receive an RRC message sent from the terminal device.

The second processing unit 62 is configured to acquire the DRB configuration confirmation instruction from the RRC message.

The embodiment of the disclosure provides a scheme for configuring a DRB ID, which is different from the existing LTE DC. When the SN configures a DRB, an ID of a newly increased DRB is not allocated in a downlink RRC reconfiguration message, or only a temporary ID of the DRB is allocated. When a terminal device receives the configuration signaling, the terminal device allocates a DRB ID, or the terminal device reconfigures the DRB ID temporarily allocated by the SN.

Therefore, by adopting the above solutions, the terminal device can allocate or reconfigure the DRB ID, so that the problem of a potential conflict of the DRB ID when the MN and the SN respectively and independently configure a DRB can be solved.

Figure 7:
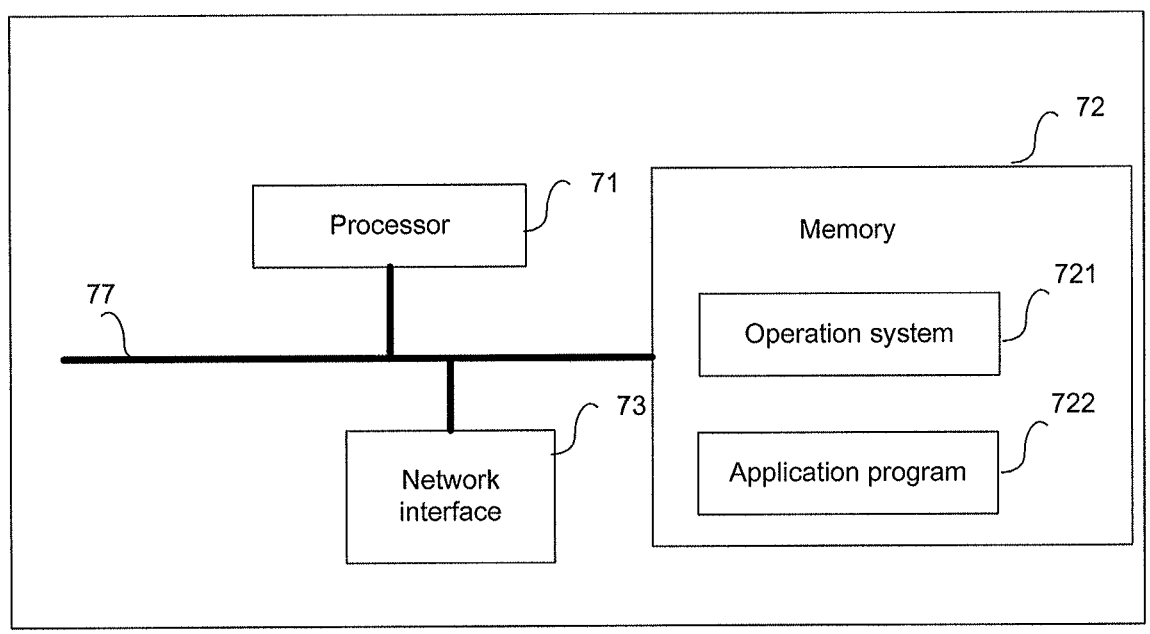
FIG. 7 shows a schematic diagram of a hardware architecture provided by an embodiment of the disclosure.

An embodiment of the disclosure further provides hardware architecture of a receiving party device. As shown in FIG. 7, the hardware architecture may include: at least one processor 71, a memory 72 and at least one network interface 73. Various components are coupled together via a bus system 74. It may be understood that the bus system 74 is configured to implement communication and connection among these components. In addition to a data bus, the bus system 74 may further include a power bus, a control bus and a state signal bus. However, for the clarity of description, various buses are integrally marked as the bus system 74 in FIG. 7.

It may be understood that the memory 72 in this embodiment of the disclosure may be a volatile memory or a nonvolatile memory, or may include both of the volatile memory and the nonvolatile memory.

In some implementation manners, the memory 72 stores the following elements: an executable module or data structure, or a subset thereof, or an extension set thereof:
an operation system 721 and an application program 722.

The processor 71 is configured to process the operations of the method in the foregoing first embodiment, which will not be repeated here.

An embodiment of the disclosure provides a computer storage medium; the computer storage medium stores a computer executable instruction; and the computer storage medium, when being executed, implements operations of the method of the foregoing first embodiment.

When being implemented in form of a software function module and sold or used as an independent product, the apparatus in the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The above-mentioned storage medium includes: various media capable of storing program codes such as a U disk, a mobile hard disk, a Read Only Memory (ROM), a magnetic disk or an optical disk. In this way, the embodiments of the disclosure are not limited to any special hardware and software combination.

Correspondingly, an embodiment of the disclosure provides a computer storage medium, which stores a computer program; and the computer program is configured to execute a data scheduling method in an embodiment of the disclosure.

For illustrative purpose, preferred embodiments of the disclosure have been disclosed, but it is appreciated by a person skilled in the art that various improvements, additions and substitutions are also possible. Therefore, a scope of the disclosure should not be limited to the above embodiments.

What is claimed is:

1. A method for allocating an Identifier (ID) of a data hearer, being applied to a terminal device and comprising:
when receiving Data Radio Bearer (DRB) configuration information sent by a network side, allocating or reconfiguring, by the terminal device, a DRB ID; and
sending, by the terminal device, a DRB configuration confirmation instruction to the network side, wherein the allocated DRB ID or the reconfigured DRB ID is used as or is contained in the DRB configuration confirmation instruction;
wherein when receiving the DRB configuration information sent by the network side, allocating or reconfiguring, by the terminal device, the DRB ID comprises:
when the DRB configuration information contains a temporary DRB ID allocated by the network side, reselecting, by the terminal device, the DRB ID, and replacing, by the terminal device, the temporary DRB ID with the DRB ID.

2. The method as claimed in claim 1, wherein when receiving the DRB configuration information sent by the network side, allocating or reconfiguring, by the terminal device, the DRB ID comprises:
when the DRB configuration information does not contain a DRB ID allocated by the network side, selecting one DRB ID from at least one available DRB ID as the allocated DRB ID.

3. The method as claimed in claim 1, wherein reselecting, by the terminal device, the DRB ID comprises:
selecting one DRB ID from at least one available DRB ID.

4. The method as claimed in claim 1, further comprising:
receiving a downlink Radio Resource Control (RRC) reconfiguration message sent by the network side, and acquiring DRB configuration information carried in the downlink RRC reconfiguration message.

5. The method as claimed in claim 1, wherein sending the DRB configuration confirmation instruction to the network side comprises:
sending a Radio Resource Control (RRC) message which carries the DRB configuration confirmation instruction to the network side.

6. A terminal device, comprising a processor and a memory configured to store a computer program capable of being executed on the processor,
wherein the processor, when executing the computer program, implements operations of the method as claimed in claim 1.

7. A computer storage medium, wherein the computer storage medium stores a computer executable instruction;

and the computer storage medium, when being executed, implements operations of the method as claimed in claim 1.

8. A terminal device, comprising:
- a first processing unit, con figured to allocate or reconfigure, when receiving Data Radio Bearer (DRB) configuration information sent by a network side, a DRB Identifier (ID), and use the allocated DRB ID or the reconfigured DRB ID as a DRB configuration confirmation instruction or arrange a DRB configuration confirmation instruction to contain the allocated DRB ID or the reconfigured DRB ID; and
- a first communication unit, configured to send the DRB configuration confirmation instruction to the network side;
- wherein the first processing unit is configured to, when the DRB configuration information contains a temporary DRB ID allocated by the network side, reselect the DRB ID, and replace the temporary DRB ID with the DRB ID.

9. The terminal device as claimed in claim 8, wherein the first processing unit is configured to select, when the DRB configuration information does not contain a DRB ID allocated by the network side, one DRB ID from at least one available DRB ID as the allocated DRB ID.

10. The terminal device as claimed in claim 8, wherein the processing unit is configured to select one DRB ID from at least one available DRB ID.

11. The terminal device as claimed in claim 8, wherein
- the first communication unit is configured to receive a downlink Radio Resource Control (RRC) reconfiguration message sent by the network side; and
- the first processing unit is configured to acquire DRB configuration information carried in the downlink RRC reconfiguration message.

12. The terminal device as claimed in claim 8, wherein
- the first communication unit is configured to send a Radio Resource Control (RRC) message carrying the DRB configuration confirmation instruction to the network side.

13. A network device, comprising:
- a second communication unit, configured to send Data Radio Bearer (DRB) configuration information to a terminal device, and receive a DRB configuration confirmation instruction sent from the terminal device, wherein the DRB configuration confirmation instruction contains a DRB Identifier (ID) allocated or reconfigured by the terminal device or a DRB ID allocated or reconfigured by the terminal device is used as the DRB configuration confirmation instruction;
- wherein the network device further comprises:
- a second processing unit, configured to provide no DRB ID in the DRB configuration information; and
- correspondingly, the second communication unit is configured to send the DRB configuration information not containing the DRB ID allocated by the network side to the terminal device;
or,
Wherein the network device further comprises;
- a second processing unit, configured to provide a temporary DRB ID in the DRB configuration information, and
- correspondingly, the second communication unit is configured to send the DRB configuration information containing the temporary DRB ID to the terminal device.

14. The network device as claimed in claim 13 wherein
- the second communication unit is configured to send a downlink Radio Resource Control (RRC) reconfiguration message carrying the DRB configuration information to the terminal device.

15. The network device as claimed in claim 13, wherein
- the second communication unit is configured to receive a Radio Resource Control (RRC) message sent from the terminal device; and
- the terminal device further comprises:
- a second processing unit, configured to acquire the DRB configuration confirmation instruction from the RRC message.

* * * * *